A. SIMON.
STARTING DEVICE.
APPLICATION FILED JUNE 12, 1907.
1,125,195.
Patented Jan. 19, 1915.
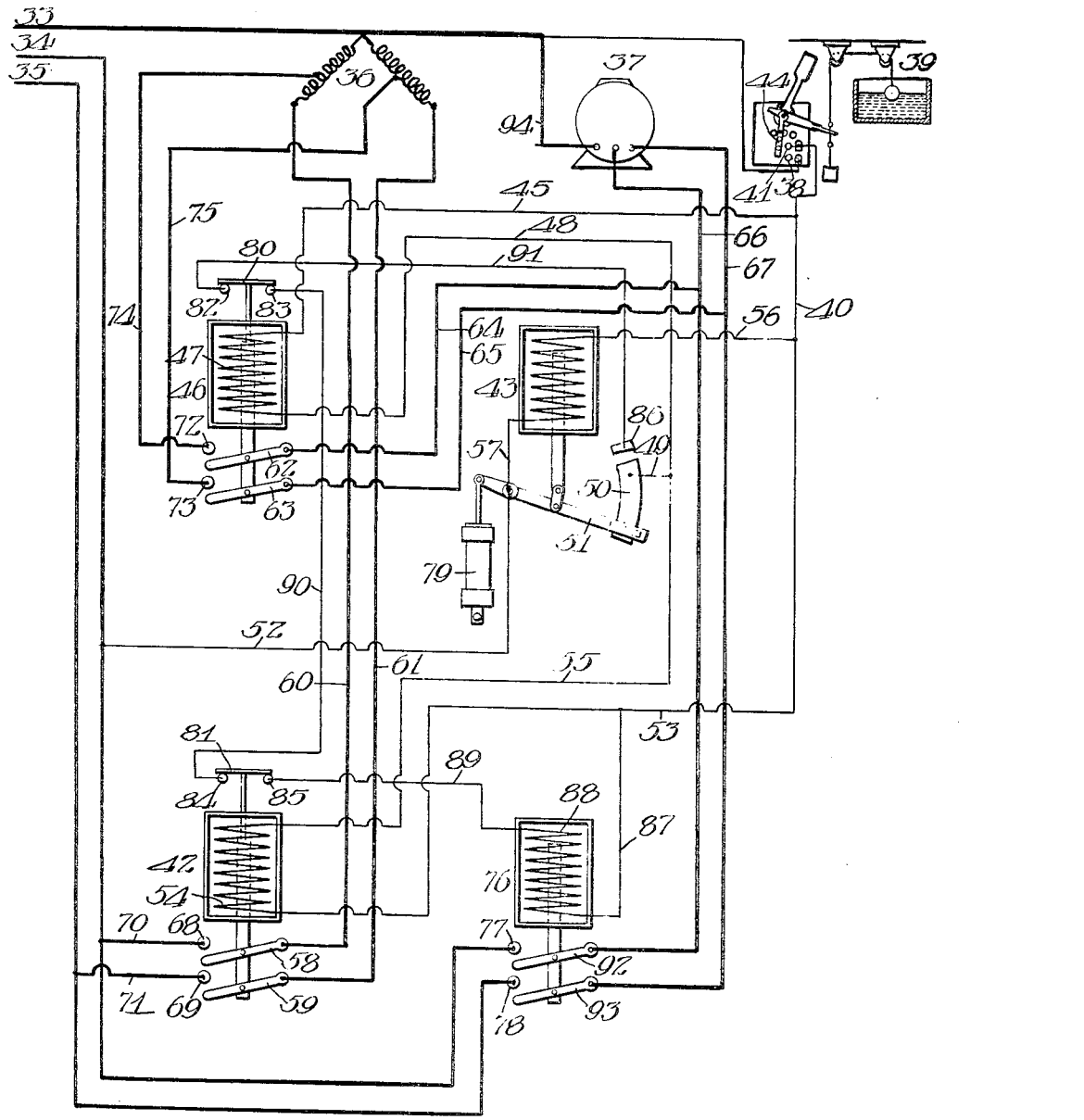
WITNESSES:
Robert N. Weir
W Perry Hahn
INVENTOR
ARTHUR SIMON
BY
Edwin B. H. Tower Jr.
ATTORNEY

UNITED STATES PATENT OFFICE.

ARTHUR SIMON, OF MILWAUKEE, WISCONSIN, ASSIGNOR TO THE CUTLER-HAMMER MFG. CO., OF MILWAUKEE, WISCONSIN, A CORPORATION OF WISCONSIN.

STARTING DEVICE.

1,125,195.

Specification of Letters Patent.

Patented Jan. 19, 1915.

Application filed June 12, 1907. Serial No. 378,646.

*To all whom it may concern:*

Be it known that I, ARTHUR SIMON, a subject of the German Emperor, residing at Milwaukee, in the county of Milwaukee and State of Wisconsin, have invented new and useful Improvements in Starting Devices, of which the following is a full, clear, concise, and exact description, reference being had to the accompanying drawing, forming a part of this specification.

My invention relates to improvements in starting devices for electric motors.

The nature of the invention is such as to make it especially adapted for use in connection with alternating current motors.

One object of my invention is to provide automatically actuated means to reduce the voltage at the motor terminals in starting the motor and, after the motor has attained a desired speed, to connect it across the mains.

Another object thereof is to provide means by which the windings of magnets for operating the various switches are in circuit and the magnets energized only during the time of starting the motor whereby they do not unnecessarily consume current and cannot become overheated.

In the accompanying drawing I have illustrated diagrammatically one form of my invention which will now be described, it being understood that various modifications may be made from the form illustrated without departing from the scope of the appended claims.

In the drawing I have illustrated diagrammatically an arrangement of devices and the circuit connections thereof for controlling an alternating current motor 37 of two or three phases. The motor 37 is preferably a three phase induction motor, and is adapted to operate a suitable pump which supplies water to the tank of a float switch 39. For establishing starting and running connections for the motor, I provide a pair of switches 62 and 63 which are adapted to connect the motor to the compensator or auto-transformer 36, and a pair of switches 92 and 93, which are adapted to connect the motor directly to the line. The joined ends of the windings of the transformer are connected directly to one conductor of the line while the opposite ends of the windings are adapted to be connected to the line by switches 58 and 59. While I preferably connect the windings of the transformer to the line by switches, it is obvious that they may be connected directly to the line and the switches 58 and 59 dispensed with if so desired.

More fully describing the connections of the motor and controlling switches, the main 33 is connected to the joined legs of the compensator 36 and also by conductor 94, with one terminal of the motor 37. An intermediate point of one of the legs of the compensator 36 is connected by conductor 74, with the stationary contact 72 of the switch 62, and an intermediate point of the opposite leg of the compensator 36 is connected by conductor 75, with the stationary contact 73 of the switch 63. The switch 62 is connected by conductors 64 and 66, with one terminal of the motor 37, and the switch 63 is connected by conductors 65 and 67, with another terminal of the motor 37. The ends of the windings of the compensator 36 are connected by conductors 60 and 61 respectively with the switches 58 and 59, and the stationary contacts 68 and 69 of these switches are connected respectively by the conductors 70 and 71, with the conductors 34 and 35 of the line. The stationary contacts 77 and 78 of the switches 92 and 93 are connected to the conductors 34 and 35 of the line, and these switches are connected by conductors 66 and 67, with two of the terminals of the motor.

The switches 62 and 63 are operated by a solenoid 46, having a suitable winding 47, the switches 58 and 59 are operated by a solenoid 42 having a suitable winding 54, and the switches 92 and 93 are operated by a solenoid 76, having a suitable winding 88. The windings 47 and 54 of the solenoids 46 and 42 are connected in parallel between the mains 33 and 34, a suitable float switch 39 having a movable arm 44, being arranged to control the circuit through said windings. The winding 88 of the solenoid 76 is connected between the mains 33 and 34, through suitable switches 81 and 80 adapted to be operated by the cores of the solenoids 42 and 47, the float switch 39 also being adapted to control the circuit of this winding 88, and it will be noted that when the switches 58 and 59 and 62 and 63 are closed, the switches 80 and 81, operated by the cores of the solenoids 46 and 42 are opened and therefore the circuit through the winding 88 is opened at these points and can not be closed until the switches 58 and 59 and 62 and 63 are again opened. In addition to the float switch for controlling the circuits of the various windings above mentioned, a time relay switch 51 is provided having stationary contacts 50 and 86. This switch is operated by a suitable solenoid 43, the action of which is retarded by a dash-pot 79.

In operation, assuming that the water in the tank of the float switch 39 falls below a predetermined point, then the switch arm 44 is caused to bridge the contacts 41 and 38, thereby closing the circuit from the main 33, across the contacts 41 and 38, by conductors 40 and 45, through the winding 47 of the solenoid 46, thence by conductors 48 and 49, to the contact 50, across the relay switch 51, and by conductor 52, to the main 34. Circuit is also closed from the conductor 40, by conductor 53, through the winding 54 of the solenoid 42, thence by conductors 55 and 49, to the contact 50, across the switch arm 51, and by conductor 52, to the main 34. The solenoids 46 and 42 being thus energized, attract their cores and the switches 58 and 59 and 62 and 63 are closed, thereby connecting the motor 37 to the winding of the compensator 36, and the windings of the compensator 36, with the lines 34 and 35. With the motor connected to the windings of the compensator 36, the motor will operate with a reduced voltage. At the same time that the circuits are established through the windings of the solenoids 46 and 42, circuit is also established from conductor 40, by conductor 56, through the winding of the solenoid 43, and thence by conductors 57 and 52, to the main 34. The winding thus being energized starts to raise its core and with it the switch 51. The upward movement, however, of the switch 51 is retarded by the dash-pot 79. The switch does not engage the contact 86 until the motor has attained the desired speed under the reduced voltage. By the time the motor has attained the desired speed, the relay arm 51 moves off the contact 50, thereby opening the circuit of the windings of the solenoids 46 and 42, permitting the switches 62 and 63 and 58 and 59 to open, and the switches 80 and 81 to close. The continued movement, however, of the relay switch 51 causes the same to engage the contact 86, thereby establishing a circuit through the winding 88 of the solenoid 76, from the conductor 40, by conductors 53 and 87, through the winding of the solenoid 86, by conductor 89 to contact 85, across the switch 81 to contact 84, thence by conductor 90 to contact 83, across the switch 80, to contact 82, by conductor 91 to contact 86, across the relay switch arm 51, and thence by conductor 52, to the main 34. The winding of the solenoid switch is thus energized and raises its core, closing the switches 92 and 93, and thereby connects the terminals of the motor directly with the mains 34 and 35. The motor thus receives the full line voltage for running. It will be seen that when running connections are thus established, the solenoids 46 and 42 are cut out of circuit and therefore the amount of current consumed is reduced, and little energy is wasted during the operation of the motor.

It will be understood that the float switch 39 is merely typical of any desired switch which may be operated at a distance to effect the starting and stopping of the motor according to the duty that it is called upon to perform, and that any well-known or desired form of time switch, pressure gage, or analogous device may be used. Furthermore it will be obvious that the number of starting steps may be varied by varying the number of auto-transformer taps and magnet switches.

Having thus described my invention what I claim as new and desire to secure by Letters Patent, is:

1. The combination with a motor, of a compensator, a compensator switch for connecting the motor to the compensator, a solenoid for operating said switch, a running switch for connecting the motor directly to the line, a second solenoid for operating said running switch, a time relay switch, a solenoid for actuating the same, a dash-pot for retarding the action of said switch, said time relay switch being adapted to deënergize said first solenoid after a predetermined interval of time and to energize said second solenoid, and means for preventing said compensator switch and said running switch from being closed at the same time.

2. The combination with a motor, of a compensator, a compensator switch for connecting said motor to said compensator, a solenoid for actuating said switch, a running switch for connecting said motor directly to the line, a solenoid for operating said switch, a time relay switch, a solenoid for actuating the same, and a dash-pot for retarding the action of said time relay switch, said time relay switch being adapted to deënergize the solenoid of said compensator switch after a predetermined interval of time and to energize said running switch.

3. The combination with a motor, of a compensator, a compensator switch for connecting the motor thereto, a solenoid for actuating said switch, a running switch for connecting the motor directly to the line, a solenoid for actuating the same, and a time relay device adapted to cause said compensator switch to disconnect the motor from the compensator after a predetermined interval of time, and to cause said second solenoid to actuate said running switch to connect the motor directly to the line.

4. In a controller for electric motors, in combination, electroresponsive means for establishing starting connections, electroresponsive means for establishing running connections, means for automatically causing said second mentioned means to respond after starting connections have been established for a predetermined length of time, and an electrical interlock between said electroresponsive means to insure interruption of the starting connections prior to establishment of the running connections.

5. In a controller for electric motors, in combination, electroresponsive means for establishing starting connections, electroresponsive means for establishing running connections, and means for deënergizing said first mentioned means after starting connections have been maintained for a predetermined period, said first mentioned means being adapted, upon interrupting starting connections, to cause said second mentioned means to respond to establish running connections.

6. In a controller for alternating current motors, in combination, a starting device, an electroresponsive switch for connecting said starting device in the motor circuit for starting, an electroresponsive switch for connecting the motor directly to the supply circuit for running, an electroresponsive relay switch having means for retarding the operation thereof, said relay switch being adapted to deënergize said first mentioned switch after the starting device has been included in circuit for a predetermined period and to cause said running switch to respond, and electrical connections between said first mentioned switches necessitating interruption of the starting connections prior to establishment of running connections.

In witness whereof, I have hereunto subscribed my name in the presence of two witnesses.

ARTHUR SIMON.

Witnesses:
  WALTER E. SARGENT,
  OSCAR A. KELLER.